(12) United States Patent
Ahn et al.

(10) Patent No.: US 12,420,301 B2
(45) Date of Patent: Sep. 23, 2025

(54) ULTRASONIC INJECTION DEVICE

(71) Applicant: The Boeing Company, Chicago, IL (US)

(72) Inventors: Jonathan Young Ahn, Seattle, WA (US); Shane E. Arthur, Kirkland, WA (US); Daniel J. Cowan, North Charleston, SC (US); Barton Stevens, Summerville, SC (US)

(73) Assignee: The Boeing Company, Chicago, IL (US)

( * ) Notice: Subject to any disclaimer, the term of this patent is extended or adjusted under 35 U.S.C. 154(b) by 417 days.

(21) Appl. No.: 17/932,273

(22) Filed: Sep. 14, 2022

(65) Prior Publication Data

US 2024/0082870 A1    Mar. 14, 2024

(51) Int. Cl.
*B05B 17/06* (2006.01)

(52) U.S. Cl.
CPC ............................. *B05B 17/0607* (2013.01)

(58) Field of Classification Search
CPC ............ B05B 17/0607; B05B 17/0676; B05B 17/063; B05B 17/0653; B05B 1/02; B05B 9/085; B05B 1/28; A61M 11/005; A61M 15/0085; A61M 15/001; A61M 37/0092
See application file for complete search history.

(56) References Cited

U.S. PATENT DOCUMENTS

| | | | |
|---|---|---|---|
| 5,358,397 A | 10/1994 | Ligon et al. | |
| 5,516,043 A * | 5/1996 | Manna | B05B 17/063 239/548 |
| 5,752,657 A | 5/1998 | Hogan et al. | |
| 6,543,700 B2 | 4/2003 | Jameson et al. | |
| 8,550,873 B2 | 10/2013 | Vijay et al. | |
| 9,446,356 B2 | 9/2016 | Milner | |
| 2004/0099699 A1 | 5/2004 | Zubeck | |
| 2015/0314577 A1 | 11/2015 | Dan-Jumbo et al. | |
| 2017/0128972 A1* | 5/2017 | Paunescu | B05B 17/0669 |
| 2021/0387208 A1 | 12/2021 | Erickson et al. | |
| 2022/0184904 A1 | 6/2022 | Widdle | |

FOREIGN PATENT DOCUMENTS

| | | |
|---|---|---|
| CH | 700656 A2 | 9/2010 |
| JP | H06246211 A | 9/1994 |

OTHER PUBLICATIONS

Extended European Search Report, dated Feb. 19, 2024, regarding EP Application No. 23194540.3, 7 pages.
Office Action, dated Apr. 17, 2023, regarding U.S. Appl. No. 17/475,066, 12 pages.

* cited by examiner

Primary Examiner — Christopher R Dandridge
(74) Attorney, Agent, or Firm — Yee & Associates, P.C.

(57) ABSTRACT

An ultrasonic injection device and methods of use are presented. The ultrasonic injection device comprises a housing, an injection nozzle attached to the housing, an ultrasonic vibration generator attached to the housing, and a pressure applicator. The injection nozzle has a number of openings configured to dispense a fluid. The ultrasonic vibration generator is configured to apply ultrasonic energy to fluid within the injection nozzle. The pressure application is configured to propel the fluid towards and out of the number of openings.

21 Claims, 11 Drawing Sheets

ULTRASONIC INJECTION DEVICE

BACKGROUND INFORMATION

1. Field

The present disclosure relates generally to applying materials between materials and more specifically to injecting liquids into gaps.

2. Background

Liquids, such as sealants, adhesives, or other types of materials can be injected between a first component and a second component during manufacturing. However, some gaps can be undesirably difficult to fill due to the shape of the gaps. For example, thin, long gaps may be undesirably difficult to fill.

Therefore, it would be desirable to have a method and apparatus that takes into account at least some of the issues discussed above, as well as other possible issues. For example, it be desirable to present an apparatus and methods that enable filling gaps with liquid by injection.

SUMMARY

An embodiment of the present disclosure provides an ultrasonic injection device. The ultrasonic injection device comprises a housing, an injection nozzle attached to the housing, an ultrasonic vibration generator attached to the housing, and a pressure applicator. The injection nozzle has a number of openings configured to dispense a fluid. The ultrasonic vibration generator is configured to apply ultrasonic energy to fluid within the injection nozzle. The pressure application is configured to propel the fluid towards and out of the number of openings.

Another embodiment of the present disclosure provides an ultrasonic injection device. The ultrasonic injection device comprises a housing comprising a channel for holding a fluid, an injection nozzle attached to a first end of the housing, an ultrasonic vibration generator attached to the housing, and a pressure applicator. The injection nozzle has a number of openings configured to dispense a fluid. The injection nozzle comprises a polymeric portion configured to contact a structure. The ultrasonic vibration generator is configured to apply ultrasonic energy to fluid within the injection nozzle. The pressure applicator is configured to propel the fluid towards and out of the number of openings.

A further embodiment of the present disclosure provides a method for applying a liquid between two components. An injection nozzle of an ultrasonic injection device is positioned relative to a gap between a first component and a second component. Ultrasonic energy is applied to a housing of the ultrasonic injection device. Pressure is applied to a fluid source fluidly connected to the injection nozzle of the ultrasonic injection device while ultrasonic energy is applied to the housing. The injection nozzle is connected to a first end of the housing. The injection nozzle comprises a number of openings configured to dispense a fluid.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. The illustrative examples recognize and take into account that viscosity of a liquid affects application of the liquid in a manufacturing process. The illustrative examples recognize and take into account that viscosity of a liquid influences injectability of the liquid. The illustrative examples recognize and take into account that a high viscosity of a liquid can make it difficult to fully disperse the liquid into a gap by injection.

The illustrative examples recognize and take into account that viscosity affects whether the liquid stays in a desired location. The illustrative examples recognize and take into account that a lower viscosity liquid could leak back outward or not remain in a targeted gap location, allowing for air to re-enter and displace the liquid. The illustrative examples recognize and take into account that a higher viscosity material with greater surface tension and stability remains in place, especially in areas where gravity may cause out flow.

Figure 1:
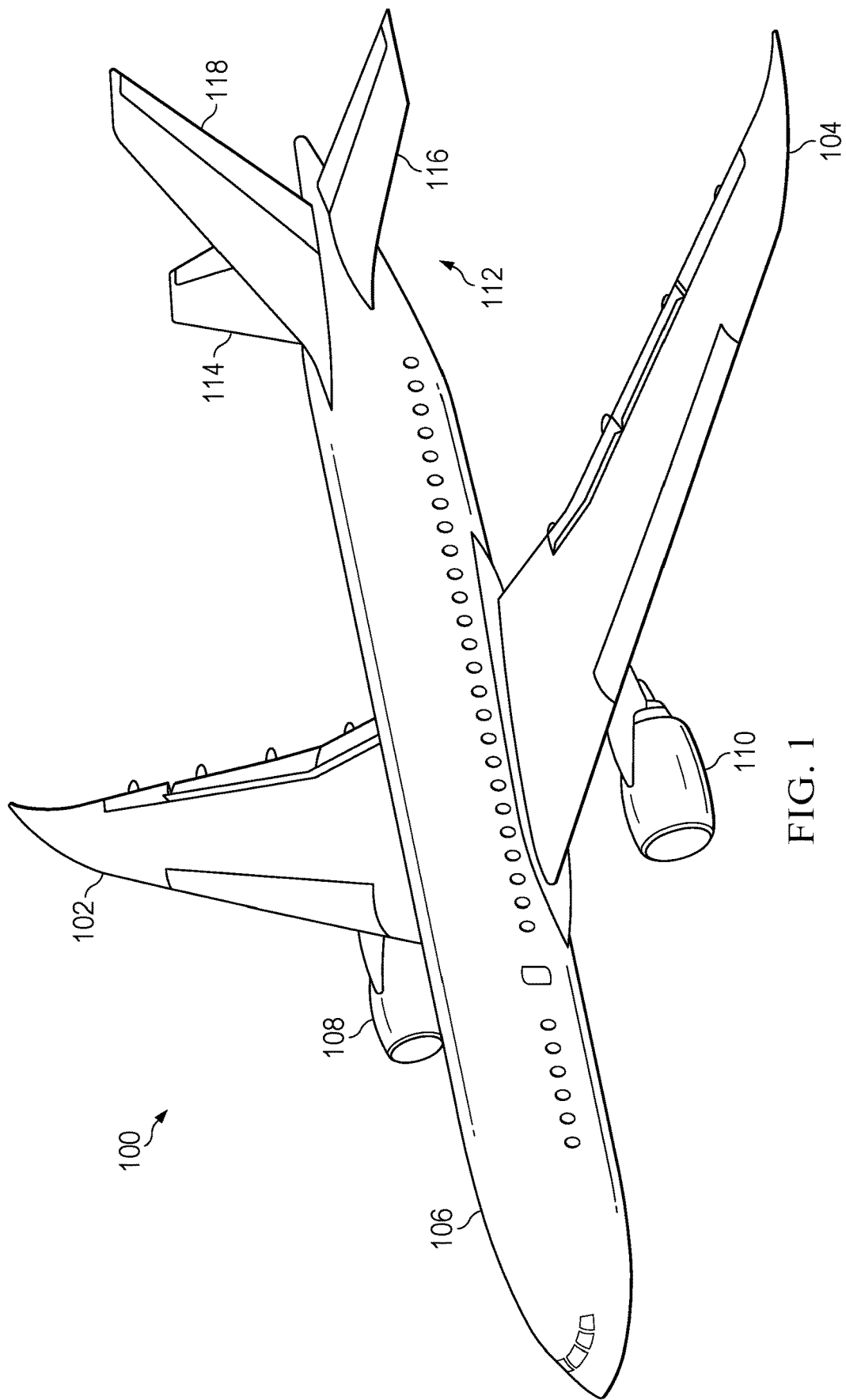
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of a platform that can be manufactured using an ultrasonic injection device. For example, portions of body 106, wing 102, or wing 104 can be manufactured using an ultrasonic injection device and methods of use.

The illustrative examples recognize and take into account that assembling large aircraft structures often utilizes shims to address gaps between parts. The illustrative examples recognize and take into account that shims fill in the small openings between parts due to limitations of manufacturing tolerances. For example, shims are commonly used between an aircraft wing spar and wing skins. Shims ensure proper loading of the aircraft.

The illustrative examples recognize and take into account that traditional shim methods have several drawbacks. The illustrative examples recognize and take into account that in order to install a shim within a gap, often times, the two mating parts are loosened to allow for the rigid shim stock to be slipped between, and then re-fastened together. The illustrative examples recognize and take into account that loosening parts can be undesirably difficult and undesirably resource intensive. The illustrative examples recognize and take into account that shim work may still not be optimal.

The illustrative examples recognize and take into account that it is desirable to reduce the manufacturing time of components. The illustrative examples recognize and take into account that reducing manufacturing steps can also reduce manufacturing cost.

The illustrative examples recognize and take into account that it can be desirable to inject a liquid shim material into gaps. The illustrative examples recognize and take into account that the use of a liquid shim material could reduce at least one of manufacturing steps, manufacturing cost, or manufacturing complexity.

Figure 2:
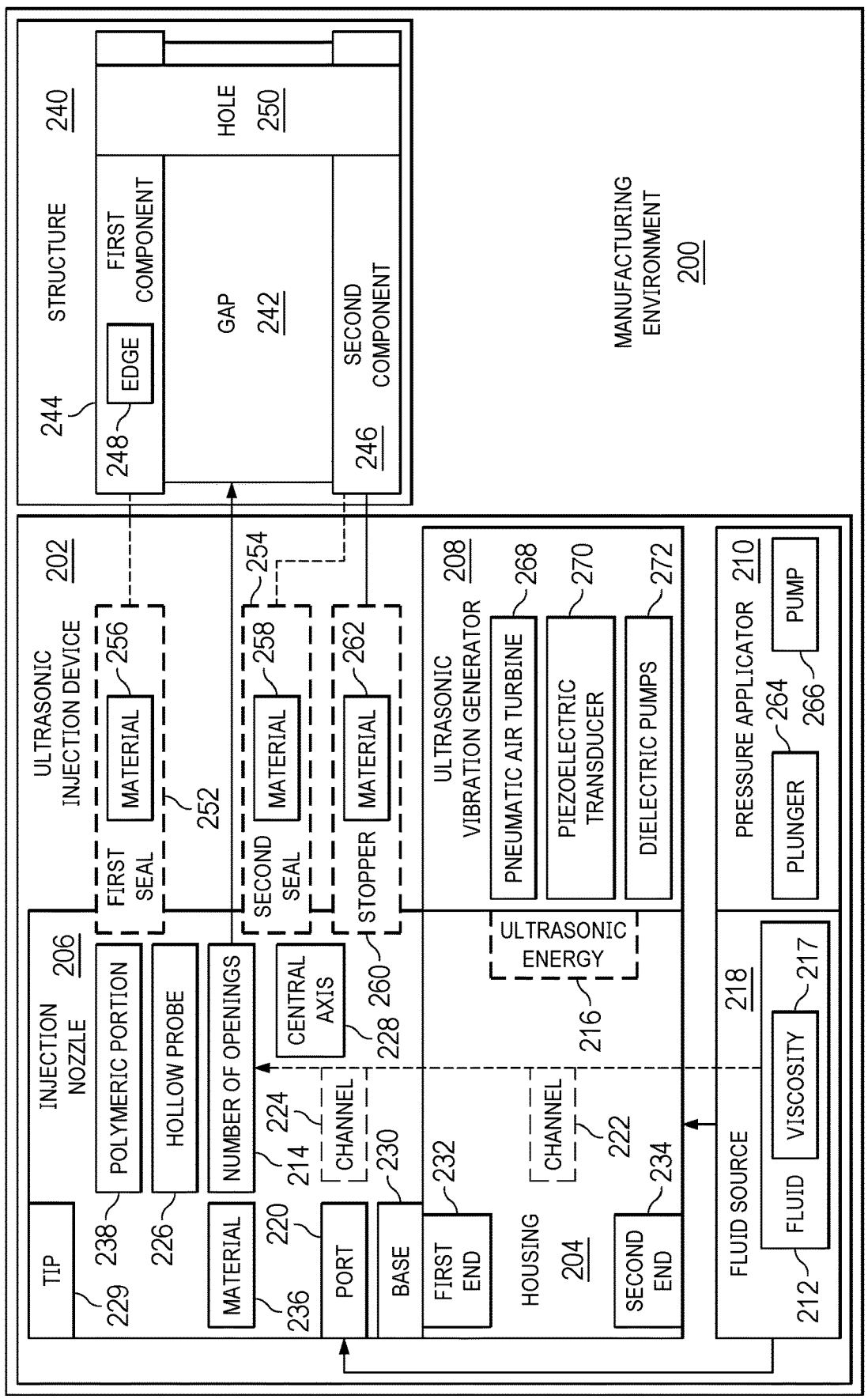
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 includes ultrasonic injection device 202. Ultrasonic injection device 202 can be utilized to fill gaps in components of aircraft 100 of FIG. 1.

Ultrasonic injection device 202 comprises housing 204, injection nozzle 206 attached to housing 204, ultrasonic vibration generator 208 attached to housing 204, and pressure applicator 210 configured to propel fluid 212 towards and out of number of openings 214. Injection nozzle 206 has number of openings 214 and configured to dispense fluid 212. Ultrasonic vibration generator 208 is configured to apply ultrasonic energy 216 to fluid 212 within injection nozzle 206.

Fluid 212 has viscosity 217. Viscosity 217 of fluid 212 is influenced by ultrasonic energy 216. Ultrasonic energy 216 reduces viscosity 217 of fluid 212 while ultrasonic energy 216 is applied to fluid 212.

In the illustrative examples, ultrasonic energy 216 cause changes to viscosity 217, in both isotropic and anisotropic materials. In some illustrative examples, ultrasonic energy 216 causes excitation within fluid 212, which propagates through neighboring fluid molecules and dampens over distance. In some illustrative examples, ultrasonic energy 216 comprises high frequency vibrations of a given amplitude, selected to be specific to fluid 212. In some illustrative examples, ultrasonic energy 216 causes heat to be generated and disrupts the smaller molecular forces that normally cause attraction between neighboring molecules within fluid 212. Ultrasonic energy 216 allows for a higher viscosity liquid to temporarily behave as a lower viscosity liquid, which enables the fluid, such as fluid 212, to traverse into smaller openings. While ultrasonic energy is affecting fluid 212, viscosity 217 can be manipulated. Ultrasonic energy 216 is applied to fluid 212 to change viscosity 217 in such a way that enhances penetration into gap 242 of structure 240.

The amplitude and frequency of vibration for ultrasonic energy 216 are selected based on a desired change to viscosity 217 of fluid 212. In some illustrative examples, the parameters/relationship of viscosity 217 of fluid 212, and the amplitude and frequency of ultrasonic energy 216 are determined. In some illustrative examples, ultrasonic energy 216 can be applied through micro-ultrasonic pulses from air pressure, or a mechanical stirrer. In some illustrative examples, ultrasonic energy 216 can be generated using pneumatics, such that ultrasonic vibration generator 208 allows for work in confined spaces.

In some illustrative examples, ultrasonic energy 216 also produces a heating effect in fluid 212 under specific controls and conditions that can also accelerate the curing of fluid 212. In some illustrative examples, ultrasonic energy 216 affects the cross-linking of fluid 212.

Fluid source 218 supplies fluid 212. In some illustrative examples, port 220 is present in injection nozzle 206. When present, port 220 in injection nozzle 206 receives fluid 212 from fluid source 218. In some illustrative examples, channel 222 for holding fluid 212 is present within housing 204. In some illustrative examples, fluid 212 travels from fluid source 218 through channel 222 of housing 204 and into channel 224 of injection nozzle 206.

In some illustrative examples, injection nozzle 206 is hollow probe 226 with central axis 228 and number of openings 214 is perpendicular to central axis 228 of hollow probe 226. In some illustrative examples, injection nozzle 206 is hollow probe 226, and number of openings 214 is a single opening at tip 229 of hollow probe 226. Tip 229 is an end of injection nozzle 206 opposite base 230. Base 230 of injection nozzle 206 is joined to first end 232 of housing 204. First end 232 of housing 204 is opposite second end 234 of housing 204.

Injection nozzle 206 is formed of any material 236 that will not undesirably interact with fluid 212. In some illustrative examples, material 236 of injection nozzle 206 comprises a metal. In some illustrative examples, material 236 of injection nozzle 206 comprises a composite material. In some illustrative examples, material 236 of injection nozzle 206 comprises a polymeric material. In some illustrative examples, injection nozzle 206 comprises polymeric portion 238 configured to contact structure 240. In these illustrative examples, polymeric portion 238 is configured to contact structure 240 without ultrasonic energy 216 damaging structure 240.

Injection nozzle 206 is configured to inject fluid 212 into gap 242 between first component 244 and second component 246 of structure 240. In some illustrative examples, injection nozzle 206 injects fluid 212 into gap 242 from under edge 248 of first component 244. In some illustrative examples, tip 229 of injection nozzle 206 is placed beneath edge 248.

In some illustrative examples, injection nozzle 206 is inserted into hole 250 of first component 244 and second component 246 to inject fluid 212 into gap 242. In some illustrative examples, first seal 252 is connected to injection nozzle 206. In some illustrative examples, second seal 254 is connected to injection nozzle 206 such that number of openings 214 is between first seal 252 and second seal 254. First seal 252 is configured to contact first component 244 and direct fluid 212 into gap 242. In some illustrative examples, first seal 252 is configured to restrict fluid 212 from exiting hole 250 through first component 244. Second seal 254 is configured to contact second component 246 and direct fluid 212 into gap 242. In some illustrative examples, second seal 254 is configured to restrict fluid 212 from exiting hole 250 through second component 246. First seal 252 is formed of material 256 configured to contact first component 244 without undesirably affecting first component 244. First seal 252 is formed of material 256 configured not to undesirably interact with fluid 212.

In some illustrative examples, material 256 is a polymeric material. Second seal 254 is formed of material 258 configured to contact second component 246 without undesirably affecting second component 246. Second seal 254 is formed of material 258 configured not to undesirably interact with fluid 212. In some illustrative examples, material 258 is a polymeric material. In some illustrative examples, material 256 is the same as material 258.

In some illustrative examples, injection nozzle 206 has stopper 260 configured to position first seal 252 and second seal 254 within structure 240. In some illustrative examples, injection nozzle 206 has stopper 260 configured to position number of openings 214 adjacent gap 242. Stopper 260 is formed of material 262 configured to contact second component 246 without undesirably affecting second component 246. In some illustrative examples, material 262 is a polymeric material.

Fluid 212 is pushed through a portion of ultrasonic injection device 202 by pressure applicator 210. In some illustrative examples, pressure applicator 210 is one of plunger 264 or pump 266.

As pressure applicator 210 advances fluid source 218, ultrasonic vibration generator 208 applies ultrasonic energy 216 to fluid 212. By applying ultrasonic energy 216 to fluid 212, viscosity 217 is reduced. Ultrasonic energy 216 from ultrasonic vibration generator 208 reduces viscosity 217 of fluid 212 exiting number of openings 214. Ultrasonic energy 216 from ultrasonic vibration generator 208 enables fluid 212 to more completely fill gap 242. In some illustrative examples, after fluid 212 enters gap 242, fluid 212 is still acted upon by ultrasonic energy 216 for a short distance. Fluid 212 has a lowered viscosity while acted upon by ultrasonic energy 216. After a portion of fluid 212 has traveled sufficiently far from hollow probe 226, ultrasonic energy 216 does not act upon the portion of fluid 212. When ultrasonic energy 216 does not act upon a portion of fluid 212, viscosity 217 of the portion of fluid 212 returns to its material viscosity.

Ultrasonic vibration generator 208 is one of a pneumatic air turbine 268, a piezoelectric transducer 270, or dielectric pumps 272. Ultrasonic vibration generator 208 is connected to housing 204 at any desirable location to apply ultrasonic energy 216 to fluid 212 exiting injection nozzle 206. In some illustrative examples, ultrasonic vibration generator 208 is positioned around a base of the injection nozzle. In some illustrative examples, ultrasonic vibration generator 208 is connected to housing 204 on second end 234 of housing 204 opposite injection nozzle 206. In some illustrative examples, ultrasonic vibration generator 208 is wrapped around a portion of housing 204.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, first seal 252 and second seal 254 can be optional. As another example, channel 222 can be optional.

Figure 3:
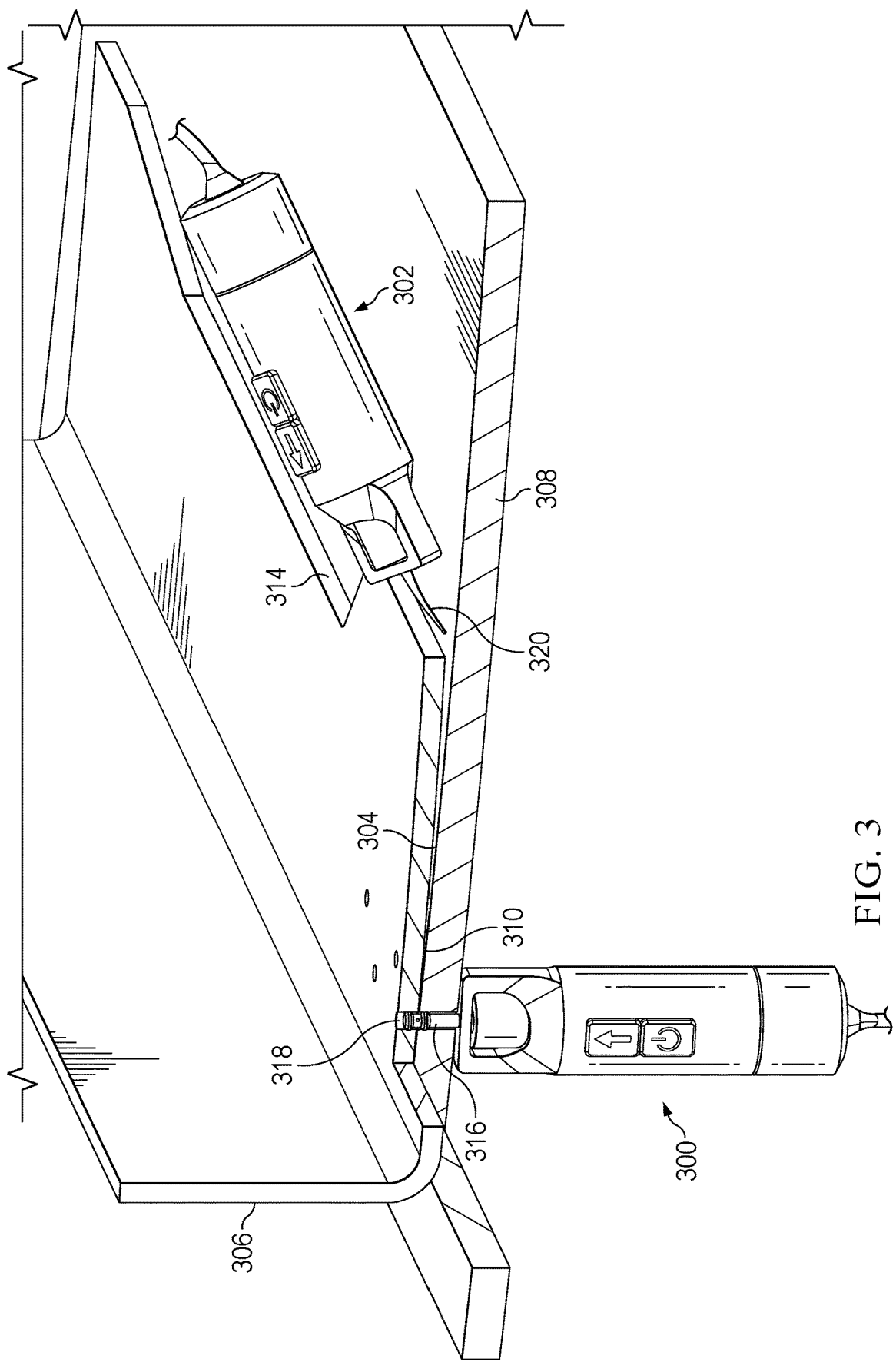
FIG. 3 is an illustration of a partial cross-sectional view of ultrasonic injection devices applying a liquid between two components in accordance with an illustrative embodiment.

Turning now to FIG. 3, an illustration of a partial cross-sectional view of ultrasonic injection devices applying a liquid between two components is depicted in accordance with an illustrative embodiment. Ultrasonic injection device 300 and ultrasonic injection device 302 are physical implementations of ultrasonic injection device 202 of FIG. 2. Joint 304 is being formed between first component 306 and second component 308. Gap 310 between first component 306 and second component 308 is present within joint 304. Gap 310 between first component 306 and second component 308 extends across joint 304 and is visible from edge 314 of first component 306.

Injection nozzle 316 of ultrasonic injection device 300 is inserted through hole 318 of first component 306 and second component 308. Injection nozzle 320 of ultrasonic injection device 302 is inserted into gap 310 between first component 306 and second component 308. Injection nozzle 320 is inserted below edge 314 of first component 306.

Figure 4:
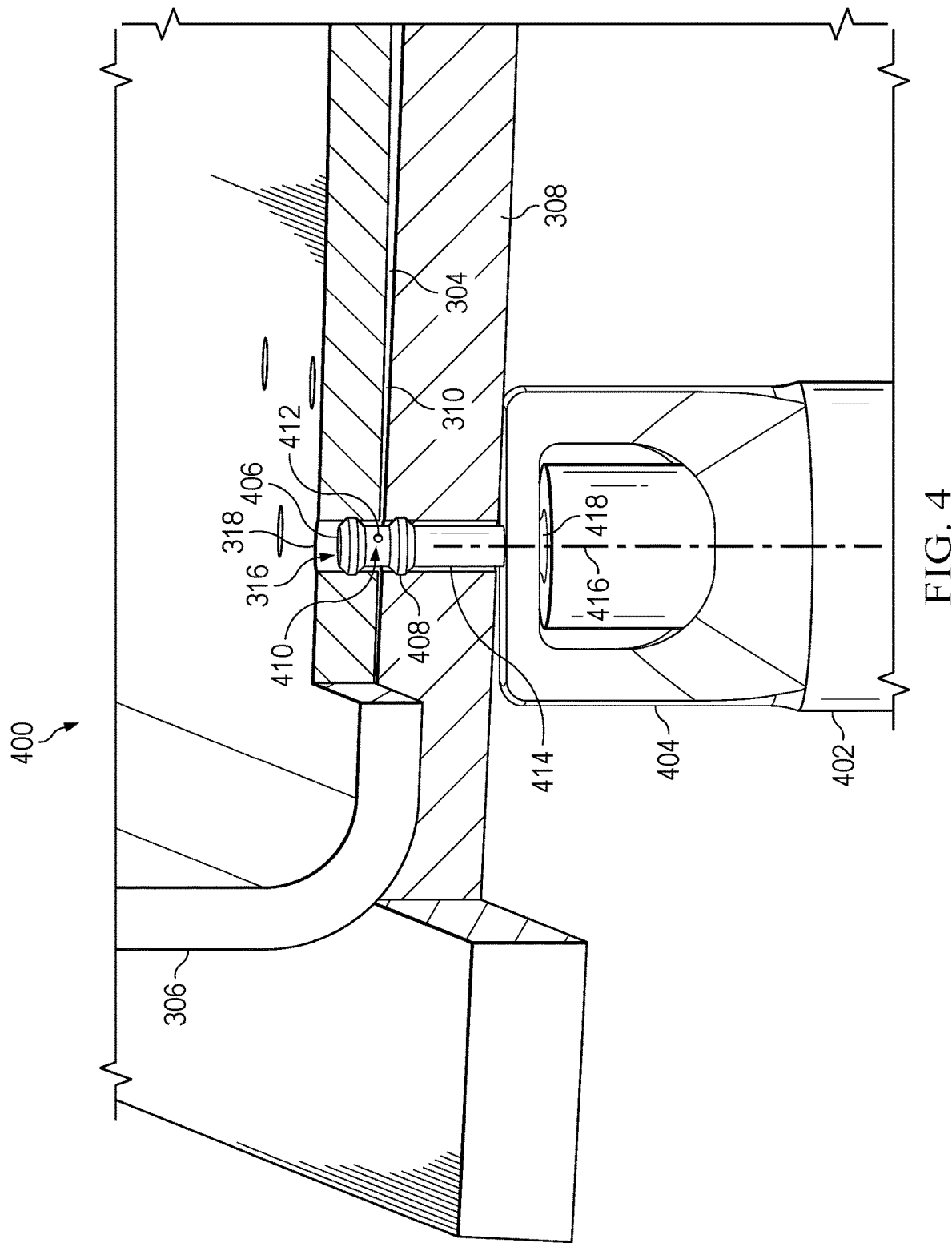
FIG. 4 is an illustration of a partial cross-sectional view of an ultrasonic injection device applying a liquid between two components through a hole in the components in accordance with an illustrative embodiment.

Turning now to FIG. 4, an illustration of a partial cross-sectional view of an ultrasonic injection device applying a liquid between two components through a hole in the components is depicted in accordance with an illustrative embodiment. View 400 is a view of injection nozzle 316 of ultrasonic injection device 300 inserted within hole 318 in first component 306 and second component 308. Ultrasonic injection device 300 comprises housing 402, injection nozzle 316 attached to housing 402, and ultrasonic vibration generator 404 attached to housing 402. In some illustrative examples, ultrasonic vibration generator 404 is one of a pneumatic air turbine, a piezoelectric transducer, or dielectric pumps.

In this illustrative example, first seal 406 is connected to injection nozzle 316. Second seal 408 is connected to injection nozzle 316 such that number of openings 410 is between first seal 406 and second seal 408. Number of openings 410 includes opening 412 in injection nozzle 316 visible in view 400. In some illustrative examples, number of openings 410 includes additional openings not visible in view 400.

In this illustrative example, injection nozzle 316 is hollow probe 414 with central axis 416. Number of openings 410 is perpendicular to central axis 416 of hollow probe 414. In this illustrative example, ultrasonic vibration generator 404 is positioned around base 418 of injection nozzle 316.

Ultrasonic energy from ultrasonic vibration generator 404 reduces the viscosity of fluid exiting number of openings 410. Ultrasonic energy from ultrasonic vibration generator 404 enables fluid to more completely fill gap 310. In some illustrative examples, after the fluid enters gap 310, the fluid is still acted upon by the ultrasonic energy for a short distance. The fluid has a lowered viscosity while acted upon by ultrasonic energy. After a portion of the fluid has traveled sufficiently far from hollow probe 414, the ultrasonic energy does not act upon the portion of the fluid. When the ultrasonic energy does not act upon a portion of the fluid, the viscosity of the portion of the fluid returns to its material viscosity.

Figure 5:
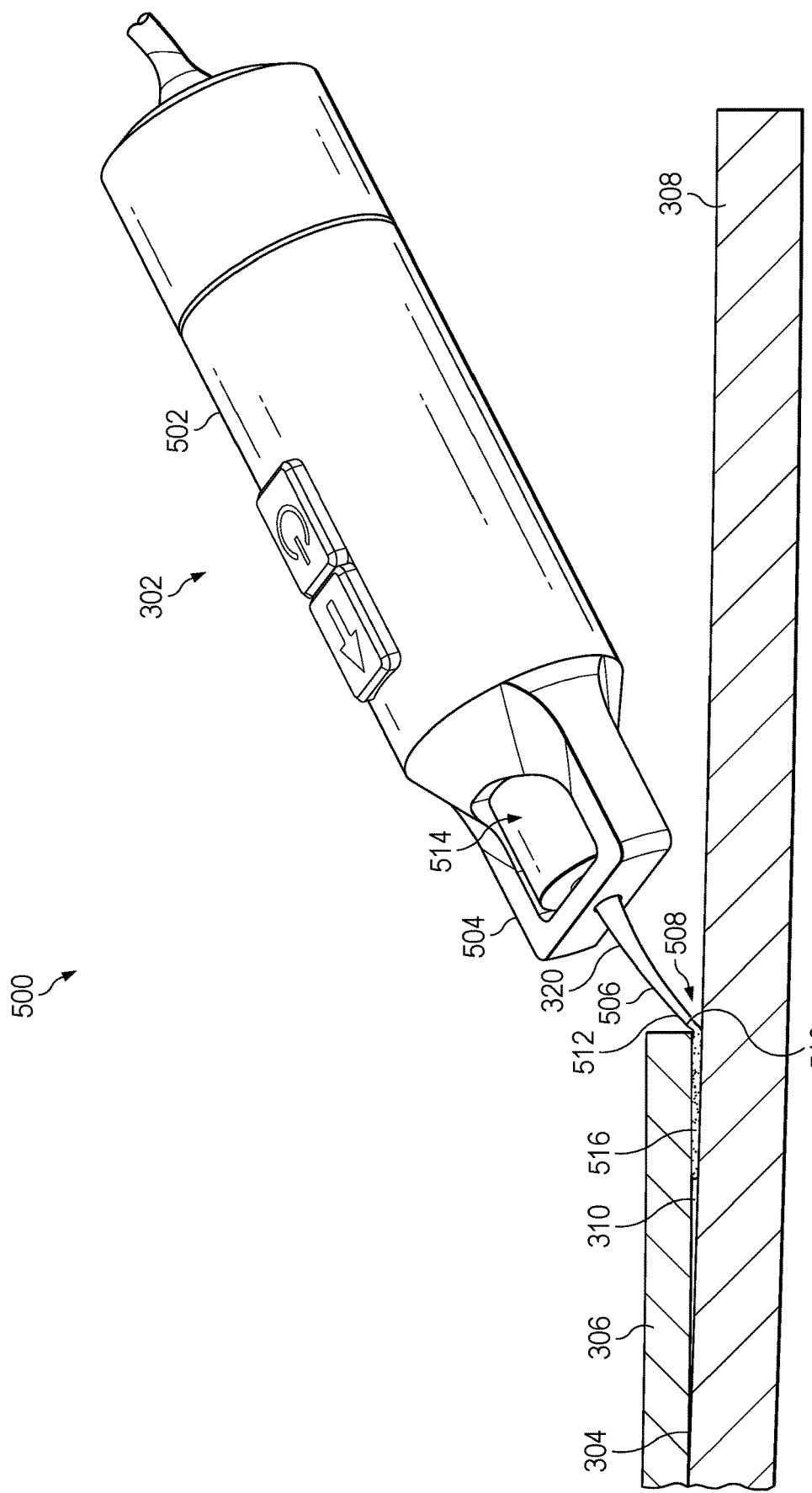
FIG. 5 is an illustration of a partial cross-sectional view of an ultrasonic injection device applying a liquid between two components through a hole in the components in accordance with an illustrative embodiment.

Turning now to FIG. 5, an illustration of a partial cross-sectional view of an ultrasonic injection device applying a liquid between two components through a hole in the components in accordance with an illustrative embodiment. View 500 is a cross-sectional view of ultrasonic injection device 302 applying fluid 516 into gap 310 between first component 306 and second component 308. Ultrasonic injection device 302 comprises housing 502, injection nozzle 320 attached to housing 502, and ultrasonic vibration generator 504 attached to housing 502. Ultrasonic vibration generator 504 is one of a pneumatic air turbine, a piezoelectric transducer, or dielectric pumps.

Injection nozzle 320 is hollow probe 506. In this illustrative example, number of openings 508 is single opening 510 at tip 512 of hollow probe 506. Ultrasonic vibration generator 504 is positioned around base 514 of injection nozzle 320.

Ultrasonic energy from ultrasonic vibration generator 504 reduces the viscosity of fluid 516 exiting number of openings 508. Ultrasonic energy from ultrasonic vibration generator 504 enables fluid 516 to more completely fill gap 310. In some illustrative examples, after fluid 516 enters gap 310, fluid 516 is still acted upon by the ultrasonic energy for a short distance. Fluid 516 has a lowered viscosity while acted upon by ultrasonic energy. After a portion of fluid 516 has traveled sufficiently far from injection nozzle 320, the ultrasonic energy does not act upon the portion of fluid 516. When the ultrasonic energy does not act upon a portion of the fluid, the viscosity of the portion of the fluid returns to its material viscosity.

Figure 6:
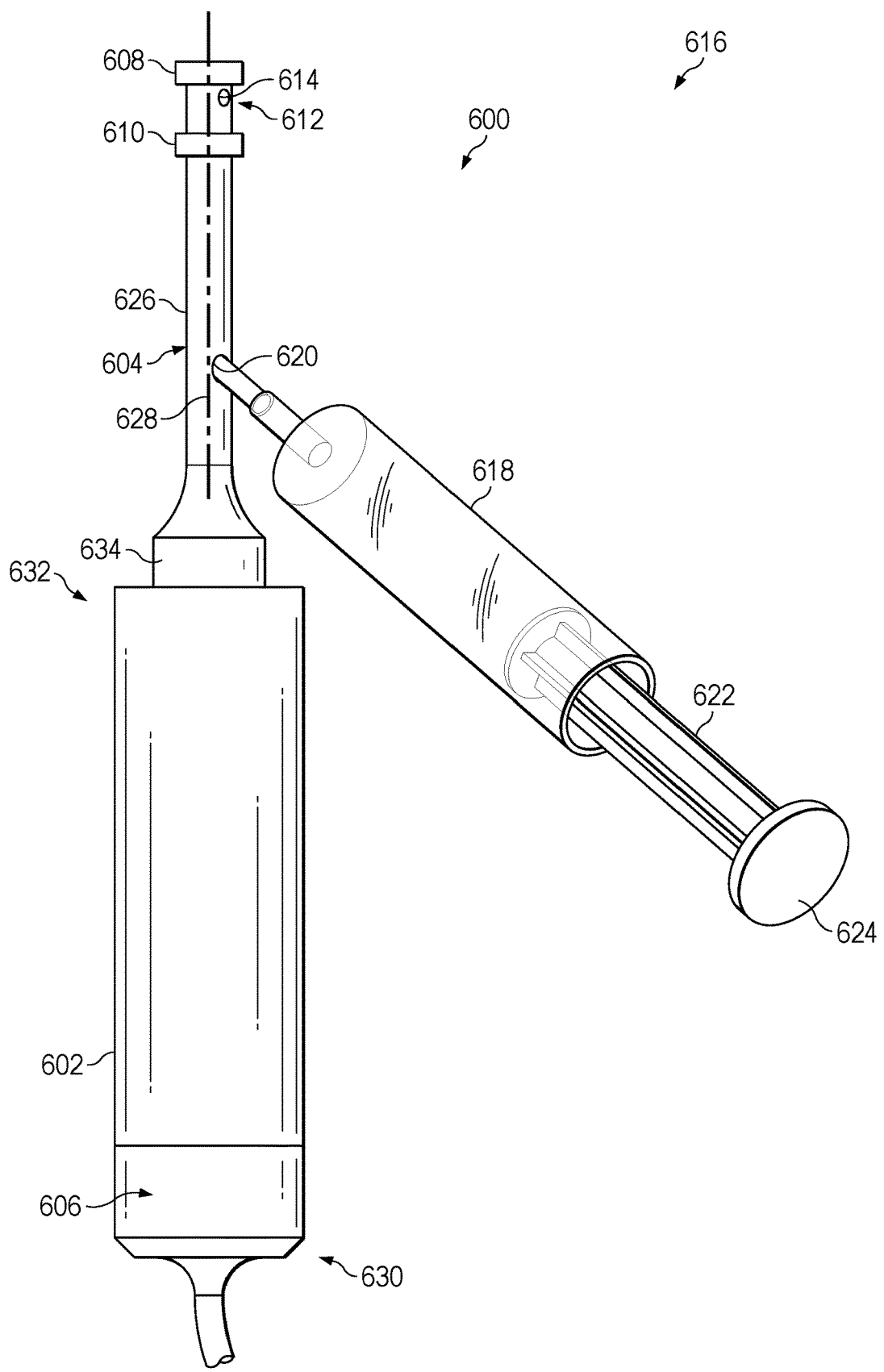
FIG. 6 is an illustration of a side view of an ultrasonic injection device in accordance with an illustrative embodiment.

Turning now to FIG. 6, an illustration of a side view of an ultrasonic injection device is depicted in accordance with an illustrative embodiment. Ultrasonic injection device 600 is a physical implementation of ultrasonic injection device 202 of FIG. 2. In some illustrative examples, ultrasonic injection device 600 can be used to inject fluid into gap 310 of FIG. 3 instead of ultrasonic injection device 300 of FIG. 3.

Ultrasonic injection device 600 comprises housing 602, injection nozzle 604 attached to housing 602, and ultrasonic vibration generator 606 attached to housing 602. In this illustrative example, first seal 608 is connected to injection nozzle 604. Second seal 610 is connected to injection nozzle 604 such that number of openings 612 is between first seal 608 and second seal 610. Number of openings 612 includes opening 614 in injection nozzle 604 visible in view 616.

In this illustrative example, fluid source 618 is connected to injection nozzle 604. Port 620 is in injection nozzle 604 for receiving fluid from fluid source 618. Pressure applicator 622 is configured to propel the fluid towards and out of number of openings 612. In this illustrative example, pressure applicator 622 is plunger 624.

In this illustrative example, injection nozzle 604 is hollow probe 626 with central axis 628. Number of openings 612 is perpendicular to central axis 628 of hollow probe 626.

In some illustrative examples, ultrasonic vibration generator 606 is one of a pneumatic air turbine, a piezoelectric transducer, or dielectric pumps. In this illustrative example, ultrasonic vibration generator 606 is connected to housing 602 on end 630 of housing 602 opposite injection nozzle 604. End 630 is opposite end 632. Base 634 of injection nozzle 604 is connected to end 632 of housing 602.

Figure 7:
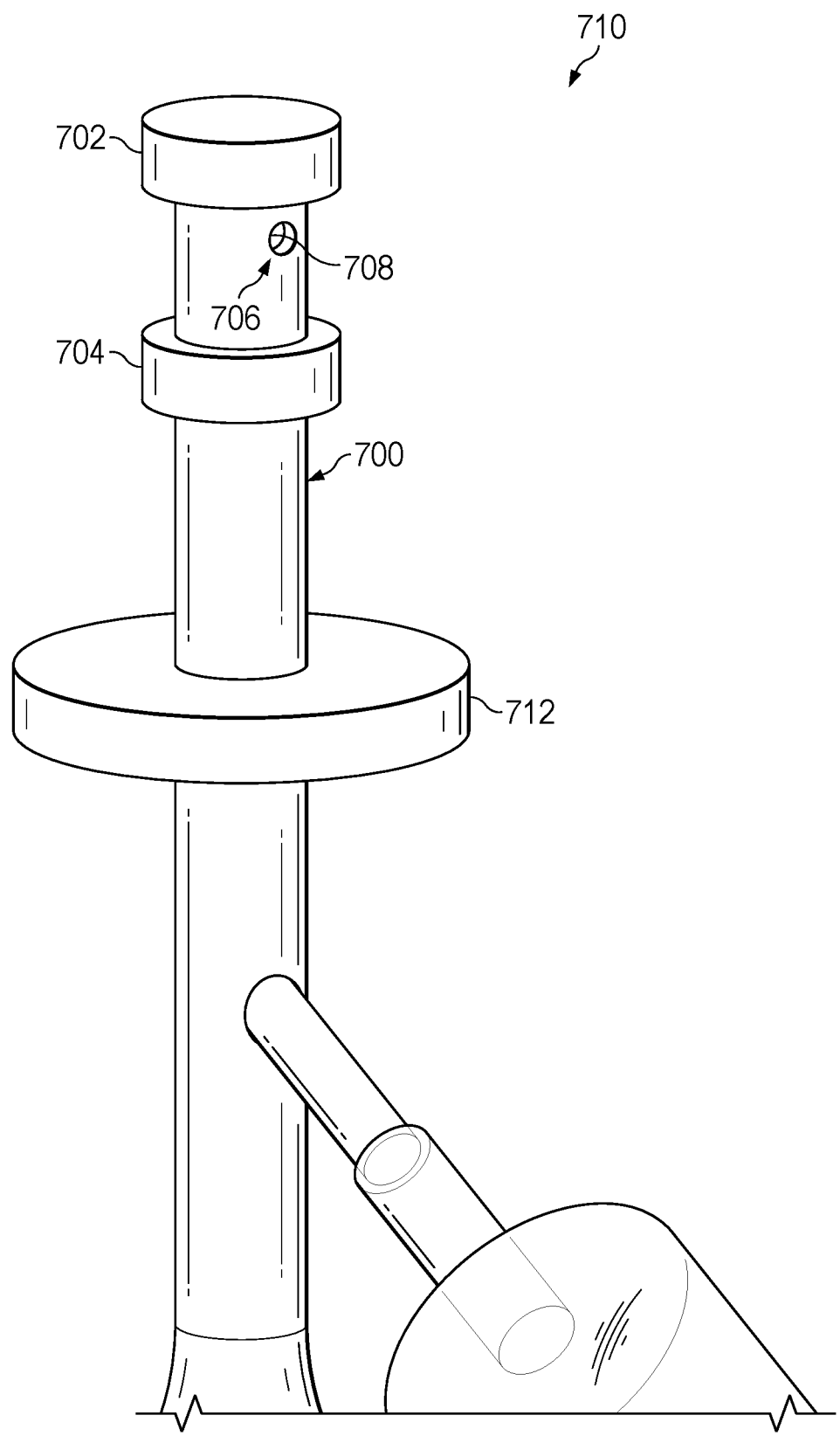
FIG. 7 is an illustration of a side view of a portion of an ultrasonic injection device in accordance with an illustrative embodiment.

Turning now to FIG. 7, an illustration of a side view of a portion of an ultrasonic injection device is depicted in accordance with an illustrative embodiment. Injection nozzle 700 is a physical implementation of injection nozzle 206 of FIG. 2. In some illustrative examples, injection nozzle 700 can be used in place of injection nozzle 604 of FIG. 6. In this illustrative example, first seal 702 is connected to injection nozzle 700. Second seal 704 is connected to injection nozzle 700 such that number of openings 706 is between first seal 702 and second seal 704. Number of openings 706 includes opening 708 in injection nozzle 700 visible in view 710.

Stopper 712 is connected to injection nozzle 700. Stopper 712 is configured to position number of openings 706 relative to a gap between a first component and a second component. Stopper 712 is configured to position injection nozzle 700 such that first seal 702 is positioned relative to a first component of a structure (not depicted) and such that second seal 704 is positioned relative to a second component of the structure (not depicted).

Figure 8:
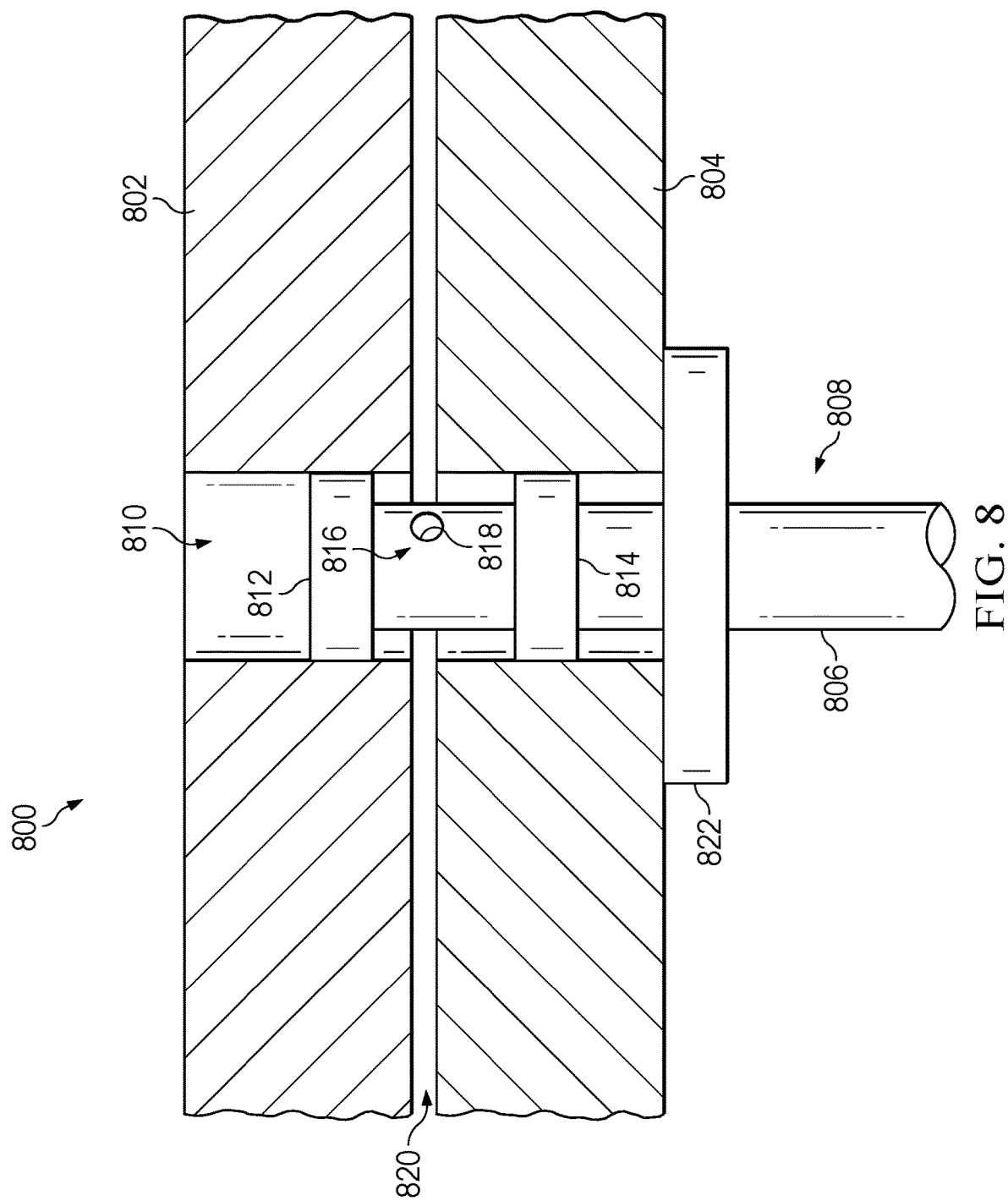
FIG. 8 is an illustration of a partial cross-sectional view of an ultrasonic injection device applying a liquid between two components through a hole in the components in accordance with an illustrative embodiment.

Turning now to FIG. 8, an illustration of a partial cross-sectional view of an ultrasonic injection device applying a liquid between two components through a hole in the components is depicted in accordance with an illustrative embodiment. View 800 is a cross-sectional view of first component 802 and second component 804. Injection nozzle 806 of ultrasonic injection device 808 is inserted into hole 810 of first component 802 and second component 804.

Ultrasonic injection device 808 is a physical implementation of ultrasonic injection device 202 of FIG. 2. In some illustrative examples, injection nozzle 806 with stopper 822 could be used in place of injection nozzle 316 of FIGS. 3-4. In some illustrative examples, injection nozzle 806 is the same as injection nozzle 700 of FIG. 7.

In this illustrative example, first seal 812 is connected to injection nozzle 806. Second seal 814 is connected to injection nozzle 806 such that number of openings 816 is between first seal 812 and second seal 814. First seal 812 is in contact with first component 802. Second seal 814 is in contact with second component 804. Number of openings 816 includes opening 818 in injection nozzle 806 visible in view 800. Number of openings 816 is positioned relative to gap 820. First seal 812 and second seal 814 resist fluid exiting hole 810. First seal 812 and second seal 814 direct the fluid into gap 820. Stopper 822 positions injection nozzle 806 relative to gap 820.

Figure 9:
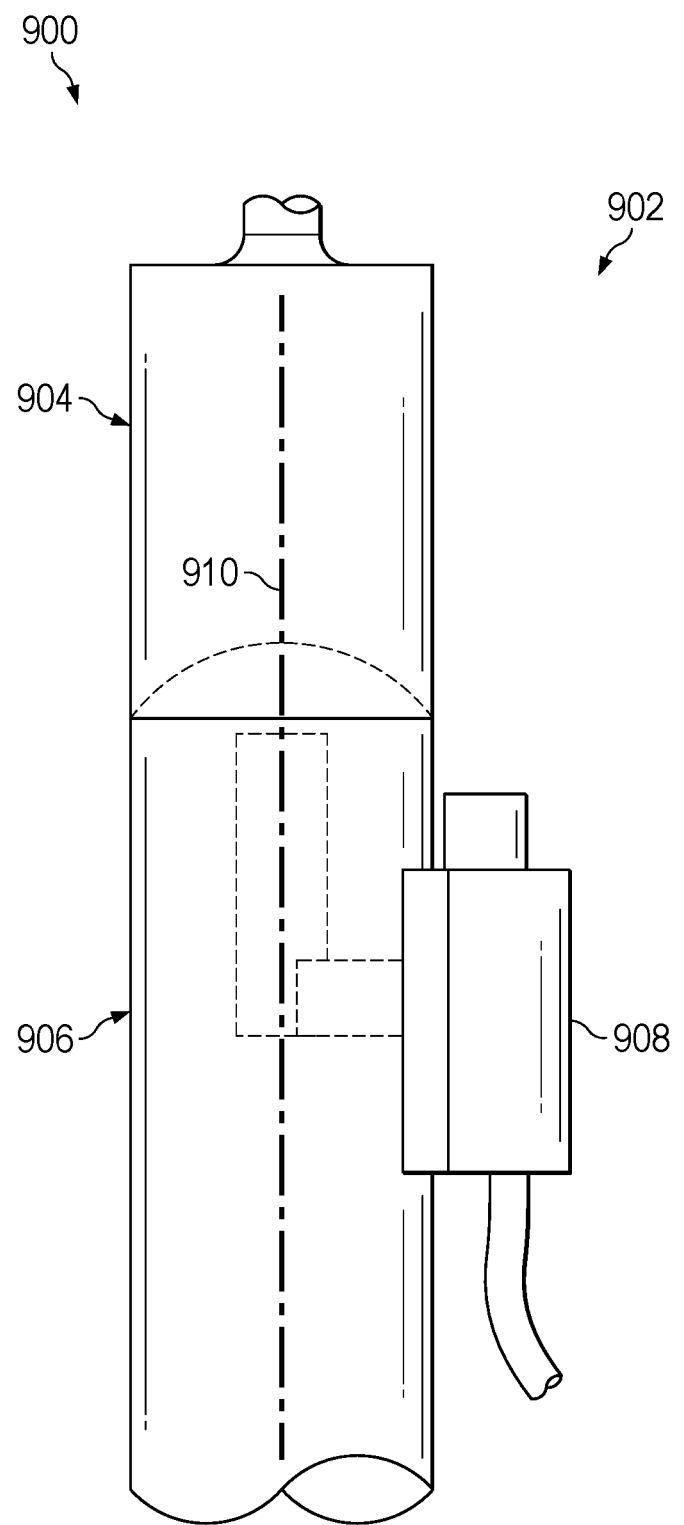
FIG. 9 is an illustration of a side view of a portion of an ultrasonic injection device in accordance with an illustrative embodiment.

Turning now to FIG. 9, an illustration of a side view of a portion of an ultrasonic injection device is depicted in accordance with an illustrative embodiment. View 900 is a view of a portion of ultrasonic injection device 902. Ultrasonic injection device 902 is a physical implementation of ultrasonic injection device 202 of FIG. 2. In some illustrative examples, ultrasonic injection device 902 could be used in place of either of ultrasonic injection device 300 or ultrasonic injection device 302 of FIGS. 3-5. In some illustrative examples, ultrasonic injection device 902 could be used in place of ultrasonic injection device 600 of FIG. 6. In some illustrative examples, ultrasonic injection device 902 could be connected to injection nozzle 700 of FIG. 7. In some illustrative examples, ultrasonic injection device 902 could be connected to injection nozzle 806 of FIG. 8.

A portion of injection nozzle 904 is visible in view 900. Ultrasonic injection device 902 comprises housing 906, injection nozzle 904 attached to housing 906, and ultrasonic vibration generator 908 attached to housing 906.

In this illustrative example, ultrasonic vibration generator 908 is wrapped around a portion of housing 906. In this illustrative example, ultrasonic vibration generator 908 applies ultrasonic energy along central axis 910 of housing 906.

Figure 10:
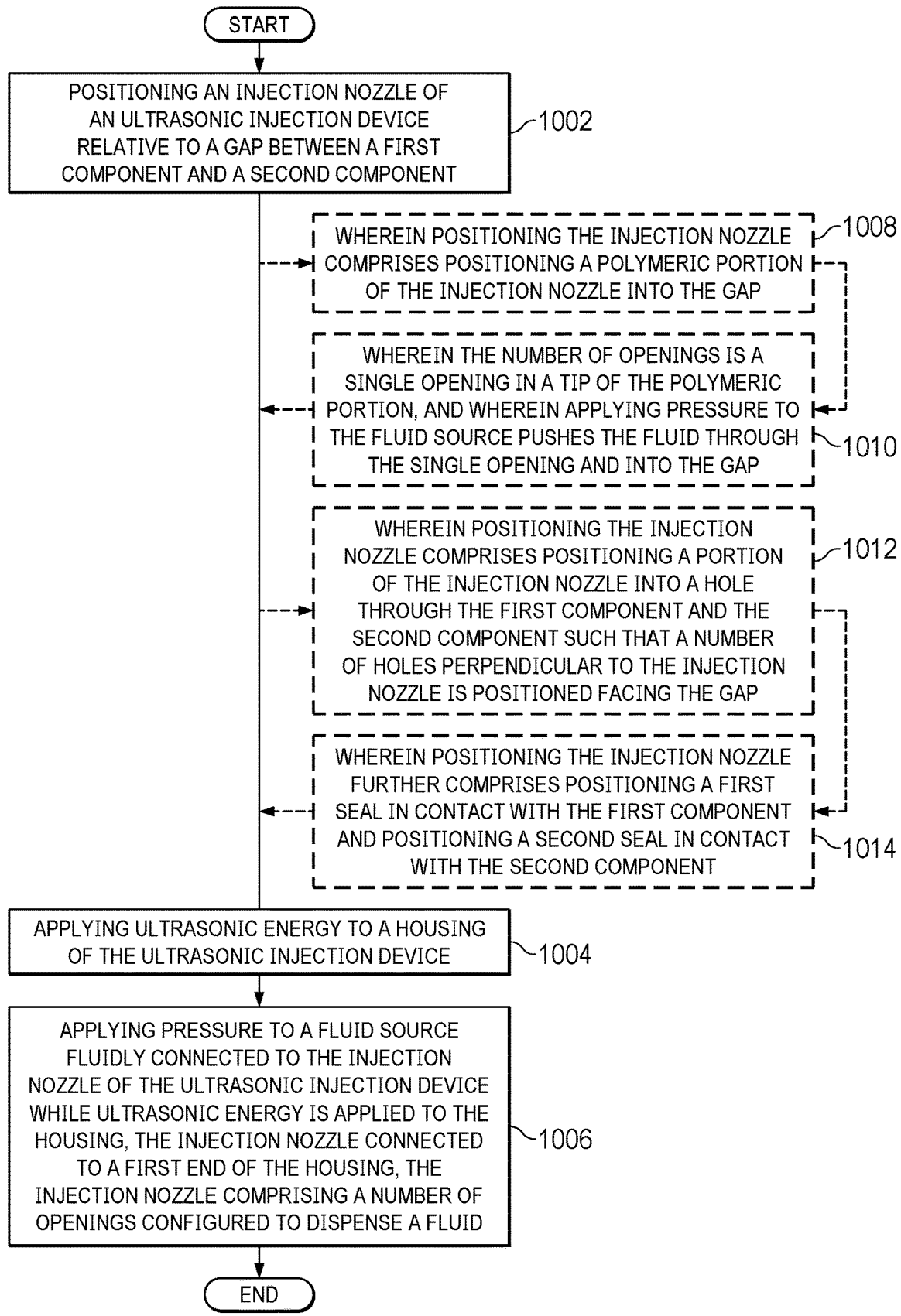
FIG. 10 is a flowchart of a method of applying a liquid between two components in accordance with an illustrative embodiment.

Turning now to FIG. 10, a flowchart of a method of applying a liquid between two components is depicted in accordance with an illustrative embodiment. Method 1000 can be used to form a component in aircraft 100 of FIG. 1. Method 1000 can be performed using ultrasonic injection device 202 of FIG. 2. Method 1000 can be performed by ultrasonic injection device 300 or ultrasonic injection device 302 of FIGS. 3-5. Method 1000 can be performed by ultrasonic injection device 600 of FIG. 6. Method 1000 can be performed by injection nozzle 700 of FIG. 7. Method 1000 can be performed by ultrasonic injection device 808 of FIG. 8. Method 1000 can be performed by ultrasonic injection device 902 of FIG. 9.

Method 1000 positions an injection nozzle of an ultrasonic injection device relative to a gap between a first component and a second component (operation 1002). Method 1000 applies ultrasonic energy to a housing of the ultrasonic injection device (operation 1004). Method 1000 applies pressure to a fluid source fluidly connected to the injection nozzle of the ultrasonic injection device while ultrasonic energy is applied to the housing, the injection nozzle connected to a first end of the housing, the injection nozzle comprising a number of openings configured to dispense a fluid (operation 1006). Afterwards, method 1000 terminates.

In some illustrative examples, positioning the injection nozzle comprises positioning a polymeric portion of the injection nozzle into the gap (operation 1008). In some illustrative examples, the number of openings is a single opening in a tip of the polymeric portion, and wherein applying pressure to the fluid source pushes the fluid through the single opening and into the gap (operation 1010).

In some illustrative examples, positioning the injection nozzle comprises positioning a portion of the injection nozzle into a hole through the first component and the second component such that a number of holes perpendicular to the injection nozzle is positioned facing the gap (operation 1012). In some illustrative examples, positioning the injection nozzle further comprises positioning a first seal in contact with the first component and positioning a second seal in contact with the second component (operation 1014).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, any of operation 1008 through operation 1014 may be optional.

Figure 11:
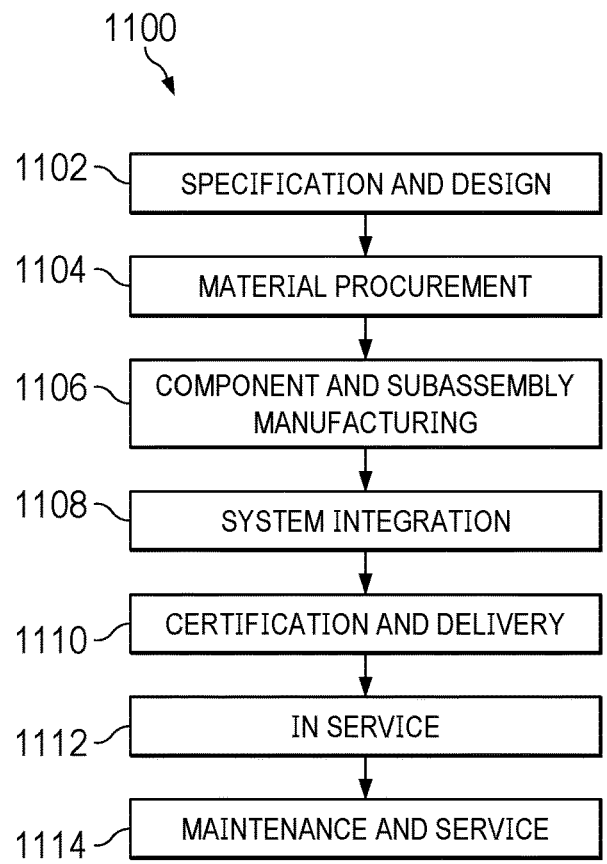
FIG. 11 is an illustration of an aircraft manufacturing and service method in a form of a block diagram in accordance with an illustrative embodiment.
Figure 12:
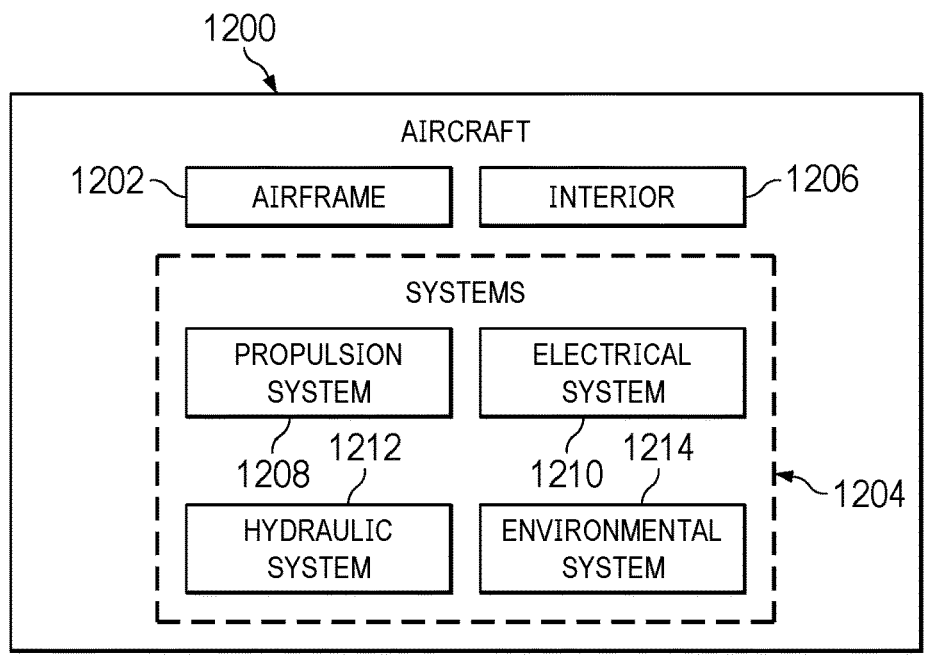
FIG. 12 is an illustration of an aircraft in a form of a block diagram in which an illustrative embodiment may be implemented.

Illustrative embodiments of the present disclosure may be described in the context of aircraft manufacturing and service method 1100 as shown in FIG. 11 and aircraft 1200 as shown in FIG. 12. Turning first to FIG. 11, an illustration of an aircraft manufacturing and service method in the form of a block diagram is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 takes place. Thereafter, aircraft 1200 may go through certification and delivery 1110 in order to be placed in service 1112. While in service 1112 by a customer, aircraft 1200 is scheduled for routine maintenance and service 1114, which may include modification, reconfiguration, refurbishment, or other maintenance and service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft in a form of a block diagram is depicted in which an illustrative embodiment may be implemented. In this example, aircraft 1200 is produced by aircraft manufacturing and service method 1100 of FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included.

Apparatuses and methods embodied herein may be employed during at least one of the stages of aircraft manufacturing and service method 1100. One or more illustrative embodiments may be manufactured or used during at least one of component and subassembly manufacturing 1106, system integration 1108, in service 1112, or maintenance and service 1114 of FIG. 11.

A portion of airframe 1202 of aircraft 1200 can be formed by method 1000. Method 1000 can be performed during component and subassembly manufacturing 1106. Ultrasonic injection device 202 can be used to form a composite structure during component and subassembly manufacturing 1106. A composite structure with gaps filled using method 1000 is present and utilized during in service 1112. Method 1000 can be performed during maintenance and service 1114 to form a replacement part.

The illustrative examples provide an ability for a liquid to more fully disperse and engulf a gap. The illustrative examples temporarily reduce a viscosity of a liquid to be injected into a gap. The illustrative examples provide an ultrasonic applicator device that dispenses a liquid and applies vibrations to the liquid to promote navigation of the fluid through complex gaps and to replace the previously occupying air spaces.

When used with a liquid shim material, the illustrative examples improve manufacturing over a traditional shim method with disassembly. The illustrative examples provide methods for filling gaps where disassembly would not be possible. The illustrative examples provide methods for filling gaps in confined spaces, such as in-tank wing areas in an aircraft.

The illustrative examples enable the use of viscous fluid gap management (liquid shim), to penetrate into very thin and narrow gaps that otherwise would not be possible due to surface tension preventing the fluid from ingress-migrating inward. The illustrative examples, enable for fluid gap management for shimming.

The illustrative examples can be used to fill gaps of 0.05" and smaller. The illustrative examples increase filling of the gaps of 0.05" or smaller where liquid surface tension tends to interfere from good penetration and distribution. In some illustrative examples, the vibrations also produces a heating effect under specific controls and conditions that can also accelerate the curing of the fluid material. In some illustrative examples, the ultrasonic vibrations affect the cross-linking of the material.

The illustrative examples provide a solution that does not require assemblies to be pulled apart to install traditional shims. The illustrative examples reduce shim installation time. The illustrative examples reduce confined space exposure to mechanics. The illustrative examples provides additional benefits as a method for depositing resin to perform composite repairs in areas otherwise inaccessible. The illustrative examples, when compared to traditional shim materials and methods, provide more uniform coverage of the gap and can eliminate the rework associated with disassembly.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An ultrasonic injection device for dispensing a fluid into a gap between a first component and a second component, comprising:
    a housing;
    an injection nozzle attached to the housing, the injection nozzle having a number of openings configured to dispense the fluid;
    a first seal connected to the injection nozzle and configured to be in contact with the first component;
    a second seal connected to the injection nozzle and configured to be in contact with the second component, the number of openings positioned on the injection nozzle between the first seal and the second seal;
    an ultrasonic vibration generator attached to the housing, the ultrasonic vibration generator configured to apply ultrasonic energy to the fluid within the injection nozzle; and a pressure applicator configured to propel the fluid towards and out of the number of openings and into the gap.

2. The ultrasonic injection device of claim 1 further comprising:
    a channel within the housing for holding the fluid.

3. The ultrasonic injection device of claim 1 further comprising:
    a port in the injection nozzle for receiving the fluid from a fluid source.

4. The ultrasonic injection device of claim 1, wherein the pressure applicator is one of a plunger or a pump.

5. The ultrasonic injection device of claim 1, wherein the injection nozzle is a hollow probe with a central axis and the number of openings is perpendicular to the central axis of the hollow probe.

6. The ultrasonic injection device of claim 1, wherein the ultrasonic vibration generator is one of a pneumatic air turbine, a piezoelectric transducer, or dielectric pumps.

7. The ultrasonic injection device of claim 1, wherein the ultrasonic vibration generator is positioned around a base of the injection nozzle.

8. The ultrasonic injection device of claim 1, wherein the ultrasonic vibration generator is connected to the housing on an end of the housing opposite the injection nozzle.

9. The ultrasonic injection device of claim 1, wherein the ultrasonic vibration generator is wrapped around a portion of the housing.

10. An ultrasonic injection device for dispensing a fluid into a gap between a first component and a second component of a structure, comprising:
    a housing for holding the fluid;
    an injection nozzle attached to a first end of the housing, the injection nozzle having a number of openings configured to dispense the fluid, a first seal of the injection nozzle configured to be in contact with the first component of the structure and a second seal of the injection nozzle configured to be in contact with the second component of the structure, the number of openings positioned on the injection nozzle between the first seal and the second seal;
    an ultrasonic vibration generator attached to the housing, the ultrasonic vibration generator configured to apply ultrasonic energy to the fluid within the injection nozzle; and
    a pressure applicator configured to propel the fluid towards and out of the number of openings.

11. The ultrasonic injection device of claim 10, wherein the injection nozzle is a hollow probe and the number of openings is perpendicular to the hollow probe.

12. The ultrasonic injection device of claim 10, wherein the ultrasonic vibration generator is positioned around a base of the injection nozzle.

13. The ultrasonic injection device of claim 10, wherein the ultrasonic vibration generator is connected to the housing on a second end of the housing opposite the first end of the housing.

14. A method for applying a fluid between two components, the method comprising:
    positioning an injection nozzle of an ultrasonic injection device relative to a gap between a first component and a second component;
    applying ultrasonic energy to a housing of the ultrasonic injection device; and applying pressure to a fluid source fluidly connected to the injection nozzle of the ultrasonic injection device while the ultrasonic energy is applied to the housing, the injection nozzle connected to a first end of the housing, the injection nozzle comprising a number of openings configured to dispense the fluid into the gap, the injection nozzle comprising a first seal in contact with the first component and a second seal in contact with the second component, the number of openings positioned on the injection nozzle between the first seal and the second seal.

15. The method of claim 14, wherein positioning the injection nozzle comprises positioning a polymeric portion of the injection nozzle into the gap.

16. The method of claim 15, wherein applying pressure to the fluid source pushes the fluid through the number of openings and into the gap.

17. The method of claim 14, wherein positioning the injection nozzle comprises positioning a portion of the injection nozzle into a hole through the first component and the second component such that the number of openings is perpendicular to a central axis of the injection nozzle and is positioned facing the gap.

18. The method of claim 17, wherein positioning the injection nozzle further comprises positioning the first seal in contact with the first component and positioning the second seal in contact with the second component within the hole.

19. The ultrasonic injection device of claim 1 further comprising:
a stopper connected to the injection nozzle, the stopper configured to contact the first component.

20. The ultrasonic injection device of claim 19, wherein the stopper in contact with the first component positions the number of openings adjacent the gap.

21. The ultrasonic injection device of claim 19, wherein the stopper in contact with the first component positions the injection nozzle such that the first seal contacts the first component and the second seal contacts the second component.

* * * * *